United States Patent
Kasper et al.

(10) Patent No.: US 10,281,924 B2
(45) Date of Patent: May 7, 2019

(54) VISION SYSTEM FOR VEHICLE DOCKING

(71) Applicant: Bendix Commercial Vehicle Systems LLC, Elyria, OH (US)

(72) Inventors: Phillip J. Kasper, Elyria, OH (US); William P. Amato, Avon, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 36 days.

(21) Appl. No.: 15/371,806

(22) Filed: Dec. 7, 2016

(65) Prior Publication Data

US 2018/0157270 A1 Jun. 7, 2018

(51) Int. Cl.
G05D 1/02 (2006.01)

(52) U.S. Cl.
CPC ......... *G05D 1/0246* (2013.01); *G05D 1/0225* (2013.01)

(58) Field of Classification Search
None
See application file for complete search history.

(56) References Cited

U.S. PATENT DOCUMENTS

| | | | |
|---|---|---|---|
| 4,974,215 A | 11/1990 | Bolz | |
| 5,226,204 A * | 7/1993 | Schoenberger | E01D 15/24 14/71.5 |
| 7,184,074 B1 * | 2/2007 | Jansen | B60R 1/00 348/151 |
| 9,342,747 B2 | 5/2016 | Kuehnle | |
| 9,565,401 B1 * | 2/2017 | Graybill | H04N 19/172 |
| 2004/0182925 A1 * | 9/2004 | Anderson | B07C 3/20 235/385 |
| 2005/0192036 A1 * | 9/2005 | Greenwood | H04N 5/232 455/501 |
| 2005/0192702 A1 * | 9/2005 | Moutsokapas | B65G 63/004 700/213 |
| 2010/0091094 A1 * | 4/2010 | Sekowski | B66F 9/0755 348/50 |
| 2011/0096166 A1 | 4/2011 | Englander | |
| 2012/0087770 A1 * | 4/2012 | Pippin | B65G 67/08 414/795.4 |
| 2013/0332217 A1 | 12/2013 | McNeill | |
| 2015/0061576 A1 * | 3/2015 | Chen | B60L 11/182 320/108 |
| 2015/0294166 A1 * | 10/2015 | Kuehnle | G06K 9/00805 701/70 |

(Continued)

OTHER PUBLICATIONS

James Theodore Dorris, "Automated Docking of a Small-Scale Tractor-Trailer Using an Infrastructure-Based System," Thesis, Dec. 2014, 160 pages, The Pennsylvania State University, United States.

(Continued)

*Primary Examiner* — Rami Khatib

(74) *Attorney, Agent, or Firm* — Cheryl L. Greenly; Brian E. Kondas; Eugene E. Clair

(57) ABSTRACT

A vision system comprises at least one camera fixedly mounted to a structure and providing a view of an area surrounding a loading dock. The at least one camera communicates with at least one transmitter capable of transmitting a video signal from the at least one camera. A receiver is located in a vehicle such that the receiver receives the transmission of the video signal from the at least one camera in response to a docking event.

16 Claims, 2 Drawing Sheets

(56) References Cited

U.S. PATENT DOCUMENTS

| | | |
|---|---|---|
| 2016/0075526 A1 | 3/2016 | Avalos |
| 2016/0171059 A1* | 6/2016 | Diamond ............... G06Q 30/02 707/722 |
| 2016/0280477 A1* | 9/2016 | Pippin .................... B65G 67/24 |
| 2017/0253131 A1* | 9/2017 | Kilic ..................... B60L 11/182 |
| 2017/0336195 A1* | 11/2017 | Suzuki ................ G01B 11/022 |
| 2018/0127027 A1* | 5/2018 | Brennan ................ B62D 13/06 |

OTHER PUBLICATIONS

Knorr-Bremse AG, "Knorr-Bremse demonstrates autonomous yard maneuvering," Press release, Sep. 28, 2016, 2 pages, Knorr-Bremse AG, Munich Germany.

\* cited by examiner

VISION SYSTEM FOR VEHICLE DOCKING

BACKGROUND

The present invention relates to embodiments of a vision system used to assist a vehicle operator in vehicle docking. A vehicle operator may require assistance to back a commercial trailer, which can be over fifty feet long, into a loading dock. He or she must ensure the tractor-trailer vehicle is aligned properly to ensure no damage is done to the rear of the trailer or to the dock during the maneuvering. The vehicle operator is also expected to perform the maneuvers in a timely manner. Some docking maneuvers require attention by a driver to his or her rear view mirrors. Some existing docking systems have light systems located on the dock to indicate to the vehicle operator how far away the back of the trailer is from the dock. Some commercial vehicles are equipped with their own backup cameras. With a backup camera, the driver is looking at an image of the dock from the point of view of the back of the trailer and the view may not include important information about the dock itself. The backup camera may be mounted on different locations on different trailers. This type of backup camera system also requires reliable communication between the tractor and the trailer. There is a desire for an improved system to assist a vehicle operator in maneuvering his vehicle into a loading dock.

SUMMARY

Various embodiments of a vision system comprise at least one camera fixedly mounted to a structure and providing a view of an area surrounding a loading dock. The at least one camera communicates with at least one transmitter capable of transmitting a video signal from the at least one camera. A receiver is located in a vehicle such that the receiver receives the transmission of the video signal from the at least one camera in response to a docking event.

In accordance with another aspect, various embodiments of an assembly for a vision system on a vehicle comprise a receiver for receiving a video signal from at least one camera in response to a docking event. The at least one camera is mounted remotely from the vehicle. The assembly also includes a display for displaying the video signal.

In accordance with another aspect, various embodiments of a method for maneuvering a vehicle using a vision system comprise enabling at least one fixedly mounted camera. The camera is mounted remotely from the vehicle and provides a view of an area surrounding a loading dock. The at least one fixedly mounted camera transmits a video signal to the vehicle. The display in the vehicle is enabled so that the video signal can be received at the display.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
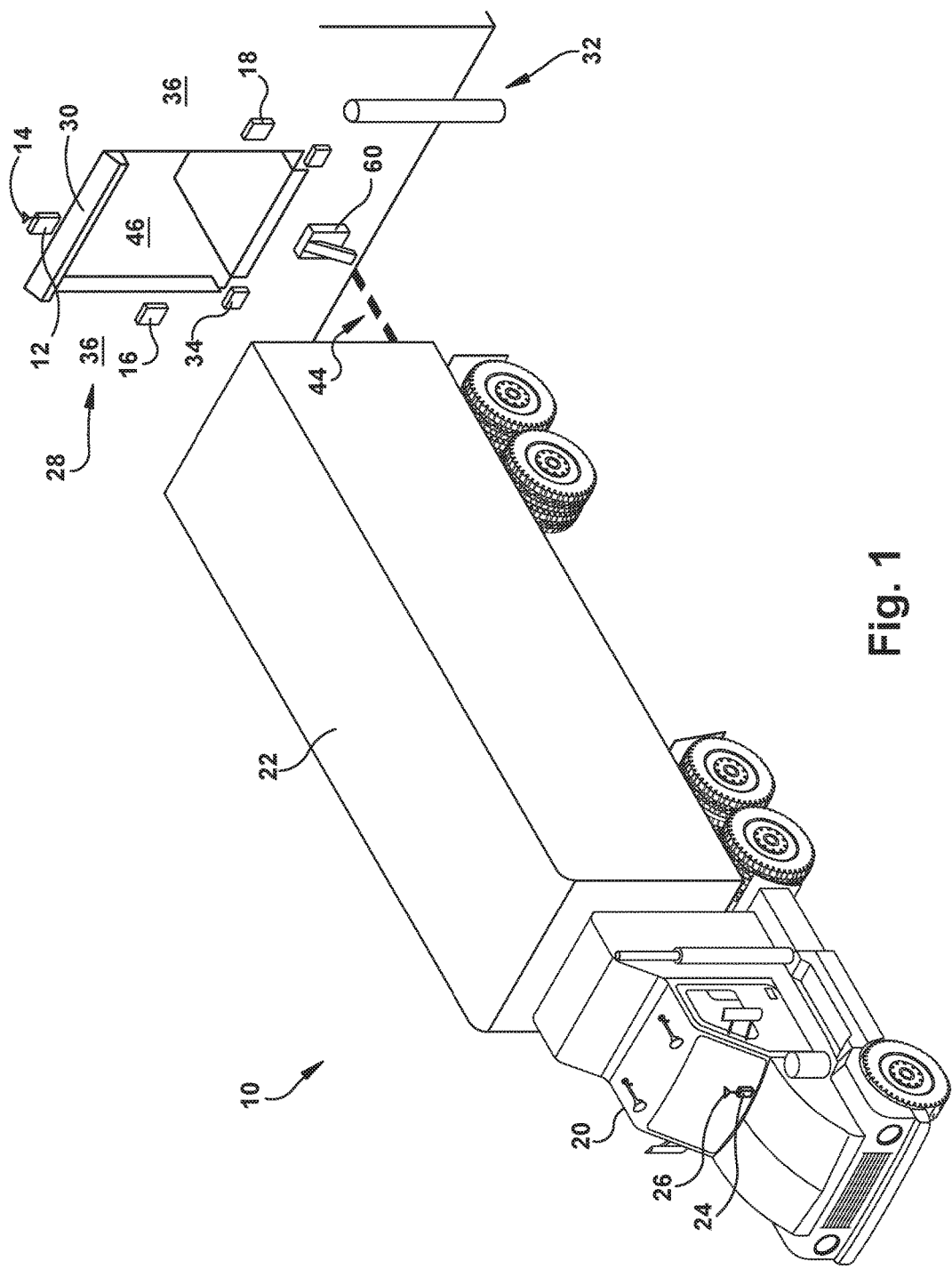
FIG. 1 illustrates loading dock vision system according to one example of this invention.

FIG. 1 illustrates a loading dock vision system 10 for providing a view of at least one loading dock 46 and an approaching commercial vehicle 22, according to one example of the invention. Vision system 10 includes at least one camera, camera 12. Camera 12 may be a commercially available camera suitable for outdoor use. Camera 12 includes a wireless transmitter 14. The transmitter 14 may be integrated with the camera 12 or may be a separate device connected to more than one camera. The transmitter 14 transmits the video signal from the camera 12. The transmitter 14 may use Bluetooth, WiFi, a proprietary protocol or other wireless protocol. The transmitter 14 may encrypt the video signal prior to transmission.

Camera 12 may be mounted on a fixed structure in order to have a view of a loading dock area 28. The camera 12 may be aimed outward and include a fish eye lens in order to capture as much of the loading dock view as possible. Alternatively, the camera 12 may be pointed relatively downward at the surface in front of the loading dock 46. The fixed structure may be the wall 30 of the loading dock 46 above the entrance to the loading dock 46. When the camera 12 is mounted above the loading dock 46, the camera view captures the entire loading dock area 28, rather than just the rear of the vehicle 22. Alternatively, the camera 12 may be mounted on the wall 36 to the side of the entrance to the loading dock 46, a pole 32 near the entrance to the loading dock 46 or other location that provides the camera 12 with a suitable view of the loading dock area 28. The camera 12 may have a view of the single loading dock 46 or may have a view of a plurality of loading docks in the vicinity of the loading dock 46.

Alternatively, the vision system 10 may include a plurality of cameras. For example, cameras 16, 18 may be placed on the wall 36 to each side of the loading dock 46. Each camera 16, 18 may have its own transmitter or each camera 16, 18 may communicate with transmitter 14. Cameras 16, 18 may be commercially available cameras suitable for outdoor use. The camera views from cameras 12, 16, 18 are synthesized prior to transmission so that the vehicle operator would receive a surround view of the vehicle 22 and the loading dock area 28. The cameras 12, 16, 18 may also be used for securing the loading dock area 28 as well as assisting the vehicle operator in docking maneuvers.

The loading dock area 28 may also include a proximity sensor 34 for determining the distance the vehicle 22 may be from the loading dock 46. The proximity sensor 34 may be an ultrasonic sensor, an infrared sensor or other type of proximity sensor. The proximity sensor 34 may communicate with transmitter 14 or may have its own transmitter.

Cameras 12, 16, 18 may have an automatic enablement feature. Cameras 12, 16, 18 may only start transmitting when the camera view includes vehicle 22. Alternatively, the cameras 12, 16, 18 may only start transmitting when the proximity sensor 34 senses vehicle 22 within a certain range. For example, the range may be about twenty-five feet from the loading dock 46. The automatic enablement feature saves power and limits which devices can receive the video signals. The cameras 12, 16, 18 may also be disabled automatically when the vehicle 22 is successfully docked in the loading dock 46.

The camera 12 may have the capability to learn the mounting location or the mounting height of the camera 12 for use in determining distance between the vehicle 22 and the edge of the loading dock 46. The loading dock area 28 may include markings 44 on the ground near the loading dock 46. Camera 12, when mounted above the entrance of the loading dock 46, may be focused on these markings 44 when no vehicle is in the loading dock area 28. The markings 44 may be configured to be used by the camera 12 to determine the mounting height of the camera 12. With this calibration, the camera 12 will be able to determine with accuracy the distance of the rear of the vehicle 22 from the dock. The camera 12 may transmit the distance information in conjunction with the video signal.

Vision system 10 includes a display 24 in a tractor 20 of vehicle 22. The display 24 includes a receiver 26 for receiving information wirelessly from the transmitter 14. The receiver 26 may be integrated with the display 24 in an assembly or may be a separate device. Display 24 may be a commercially available display suitable for use in a vehicle. The receiver 26 communicates in the same protocol as the transmitter 14 so that the receiver 26 can interpret and display the video signals. The receiver 26 may also include decryption functions to decrypt an encrypted signal from the transmitter 14. The receiver 26 may also receive signals from the proximity sensor 34 or other cameras 16, 18 when there are separate transmitters.

The display 24 is located in the tractor 20 in view of a driver. The display 24 may be enabled by the driver of the vehicle 22. The receiver 26 may be paired with the transmitter 14 in response to predetermined criteria. Transmitter 14 may wait for a handshake signal from the receiver 26 of the vehicle 22, indicating that the vehicle 22 is ready to approach the loading dock 46. In another example, the driver may be required to enter a code into the display 24 before the display 24 will receive video signals from the camera 12. In a situation where multiple cameras may be installed near multiple loading docks, the driver may select from which of the cameras to receive video signals. In another example, the camera 12 determines the serial number of the vehicle 22 from either the license plate or other identification on the trailer body when the vehicle 22 is in view of the camera 12. The driver enters the serial number of the trailer into the display either at the beginning of a trip or upon arrival at the docking area 28. The transmitter 14 will then pair with the receiver 26 when the camera determined serial number matches the serial number entered by the driver. Alternatively, the camera 12 may authorize the receiver 26 to receive the video signal in response to the aforementioned identification of the vehicle 22.

The display 24 may communicate with other controllers on the vehicle 22, such as the transmission controller. When the display 24 is in communication with the transmission controller, the display 24 receives a message indicating when the vehicle 22 is moving in reverse. When the vehicle 22 is in reverse gear, the display 24 may be enabled to receive the video signals from the camera 12.

The display 24 may include guidance instructions for assisting the driver in backing up the vehicle 22. In one example, the display 24 may superimpose guidance lines on the displayed image to help the driver back up the vehicle 22 in a straight manner. In an example with multiple cameras 12, 16, 18 focused on the loading dock 46, the driver may be able to cycle through the views from each of these cameras 12, 16, 18 using the display 24 so that the driver can choose which view is the best for his particular maneuver.

The receiver 26 may be in communication with an autonomous driving system in the tractor 20. As soon as the receiver 26 is receiving video images from the transmitter 14, the autonomous driving system may use the video images to engage other vehicle systems, such as the engine and steering, independent of the driver to assist in maneuvering the vehicle.

The display 24 may also be a multifunction display, such that when the vision system 10 is not being used, the display 24 may display information about the trip, active fault codes or the like.

Therefore, a vision system comprises at least one camera fixedly mounted to a structure and providing a view of an area surrounding a loading dock. The at least one camera communicates with at least one transmitter capable of transmitting a video signal from the at least one camera. A receiver is located in a vehicle such that the receiver receives the transmission of the video signal from the at least one camera in response to a docking event.

Furthermore, an assembly for a vision system on a vehicle comprises a receiver for receiving a video signal from at least one camera in response to a docking event. The at least one camera is mounted remotely from the vehicle. The assembly also includes a display for displaying the video signal.

Figure 2:
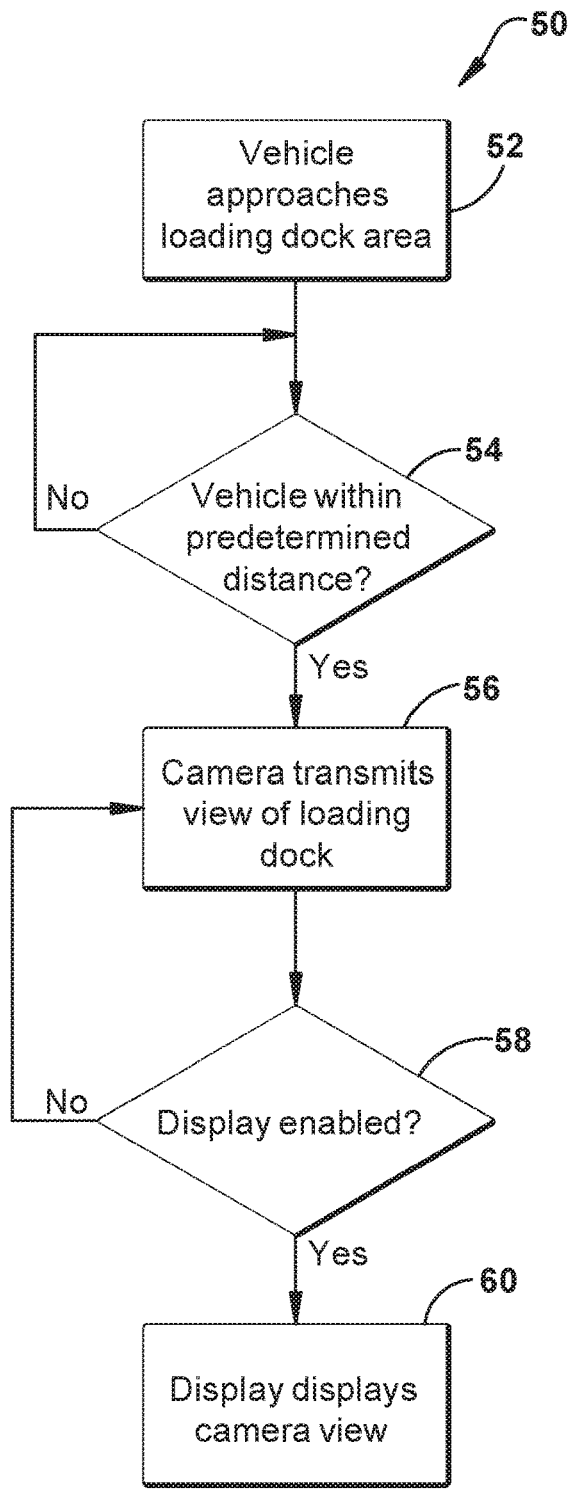
FIG. 2 illustrates a method of vehicle docking using the vision system.

FIG. 2 illustrates a method 50 of using the vision system 10 for maneuvering the vehicle 22 into the dock 46 according to one example of the invention. In step 52, the vehicle 22 approaches the loading dock area 28. In step 54, the camera 12 or proximity sensor 34 determines if the vehicle 22 is within a predetermined distance of the loading dock area 28. In one example, the predetermined distance is about 25 feet. In another example, the predetermined distance is the distance in which the vehicle 22 is sensed by the proximity sensor 34 or within view of the camera 12. If the vehicle is equal to or greater than a predetermined distance, the method remains at step 54.

If the vehicle 22 is less than a predetermined distance from the loading dock area 28, the method continues to step 56. In step 56, the camera 12 begins transmitting the view of the loading dock area 28.

In step 58, it is determined if the display 24 is enabled. If the display 24 is not enabled, the method returns to step 56. If the display 24 is enabled, the display 24 may decrypt the video signals and display the received images in step 60.

Therefore, a method for docking a vehicle using a vision system comprises enabling a fixedly mounted camera in response to a vehicle being within a predetermine proximity of the camera, the camera being remote from the vehicle; transmitting a video signal from the camera to the vehicle; enabling a video display in the vehicle; and receiving the video signal at a display in the vehicle.

The vision system 10 of the present invention is also advantageous in that the display of the vehicle from the point of view of the loading dock area assists the driver in determining whether his rear fairings on the trailer are retracted. Having all of the cameras and the sensors on the loading dock itself instead of on each vehicle approaching the loading dock saves on hardware costs for vehicle manufacturers and fleets.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vision system comprising:
   at least one camera fixedly mounted to a loading dock structure and providing a view of an area surrounding the loading dock;
   at least one transmitter beginning transmission of a video signal from the at least one camera in response to the vehicle being in view of the at least one camera;
   a receiver located in a vehicle; wherein the receiver receives the transmission of the video signal from the at least one camera in response to the vehicle being in view of the at least one camera; and
   a display located in the vehicle, the display displaying the video signal in response to at least one of the vehicle being in reverse gear and a driver entering a serial number of the vehicle in the display.

2. The vision system as in claim 1, wherein the at least one camera includes a vertical camera mounted at a location vertically above an opening of the loading dock.

3. The vision system as in claim 2, wherein the vertical camera is calibrated to detect a mounting height of the vertical camera for use in determining the distance between the vehicle and the loading dock.

4. The vision system as in claim 2, wherein the vertical camera is an outward facing camera.

5. The vision system as in claim 4, wherein the at least one camera includes two horizontal cameras, each horizontal camera mounted at opposite sides of the opening of the loading dock and aimed at the opposite horizontal camera.

6. The vision system as in claim 1, wherein the at least one camera includes at least one horizontal camera mounted at a location on a side of an opening of the loading dock.

7. The vision system as in claim 1, wherein the at least one transmitter encrypts the video signal prior to transmission.

8. The vision system as in claim 7, wherein the receiver is capable of decrypting the video signal.

9. The vision system as in claim 1, wherein the transmission of the video signal is discontinued in response to the vehicle completing maneuvers at the loading dock.

10. The vision system as in claim 1, wherein the at least one camera is a plurality of cameras and the at least one transmitter is a single transmitter, wherein the single transmitter transmits video signals from the plurality of cameras.

11. The vision system as in claim 1, wherein the vision system is capable of communicating with an autonomous driving system in the vehicle, wherein the autonomous driving system receives the video signal and engages a vehicle system to maneuver the vehicle in the area surrounding the loading dock in response to the video signal.

12. An assembly for a vision system on a vehicle comprising:
    a receiver for receiving a video signal from at least one camera only in response to the vehicle being in view of the at least one camera, the at least one camera being mounted remotely from the vehicle on a loading dock structure; and
    a display for displaying the video signal in response to at least one of the vehicle being in reverse gear and a driver entering a serial number of the vehicle in the display.

13. The assembly as in claim 12, wherein the at least one camera includes a plurality of cameras; the assembly further comprising a driver input device for selecting a camera view to display from the plurality of cameras.

14. The assembly as in claim 12, wherein the receiver is capable of decrypting the video signal.

15. The assembly as in claim 12, wherein the display is a multi-function display capable of receiving signals from other system controllers on the vehicle.

16. The assembly as in claim 12, wherein the display includes alignment features to assist the driver in maneuvering the vehicle with respect to the loading dock.

* * * * *